April 10, 1962 — A. S. COFFINBERRY — 3,029,142
REACTOR FUEL SCAVENGING MEANS
Filed May 24, 1960 — 2 Sheets-Sheet 1

WITNESSES:

INVENTOR.
Arthur S. Coffinberry
BY

April 10, 1962  A. S. COFFINBERRY  3,029,142
REACTOR FUEL SCAVENGING MEANS
Filed May 24, 1960  2 Sheets-Sheet 2

WITNESSES:

INVENTOR.
Arthur S. Coffinberry
BY
ATTORNEY

UnitedStates Patent Office 3,029,142
Patented Apr. 10, 1962

3,029,142
REACTOR FUEL SCAVENGING MEANS
Arthur S. Coffinberry, Los Alamos, N. Mex., assignor to the United States of America as represented by the United States Atomic Energy Commission
Filed May 24, 1960, Ser. No. 32,072
3 Claims. (Cl. 75—84.1)

The present application is a continuation-in-part of an application filed by the present inventor on December 5, 1957, S.N. 700,917, now abandoned.

This invention relates to systems wherein liquid fuels from or in nuclear reactors may be purified by scavenging fission products from the liquid metal fuel and in particular to metals for accomplishing said scavenging.

Nuclear reactors using as a fuel a liquid metal have many advantages by virtue of the fuel being in liquid form. One of the prime advantages of such a reactor is that fuel may be reprocessed or cleansed by techniques not usable with solid fuel reactors. In a solid fuel reactor the fuel elements must be removed as discrete units and melted, dissolved or otherwise put into solution so that the fission products may be removed in a homogeneous manner. When a liquid metal is used as a reactor fuel it is apparent that the fuel is always in solution form and readily available for purification.

By this invention a system is disclosed whereby the liquid metal fuel may be purified without changing the chemical nature of the fuel in any manner. It is not necessary to convert the liquid metal fuel to any chemical compound as is done in purifying solid metal fuel elements, nor is it necessary to heat or otherwise treat the liquid metal fuel. This unusual system for purifying liquid metal fuels is possible because of the unusual cleansing action exhibited by certain elements when in intimate contact with plutonium or other liquid reactor fuel. Utilizing the system of the present invention the liquid metal reactor fuel may be cleansed right within the critical region of the reactor during normal reactor operation.

Therefore, it is an object of this invention to provide a means for cleaning liquid metal reactor fuels without changing the nature of the fuel.

Another object of this invention is to provide a means for cleaning liquid metal reactor fuels without interfering with the normal operation of the reactor.

Another object of the present invention is to provide a means for cleaning liquid metal reactor fuels within the critical area of the reactor.

Another object of the present invention is to provide a system for cleaning a liquid metal reactor fuel external to the critical area of the reactor without interfering with the normal operation of the reactor.

Figure 1:
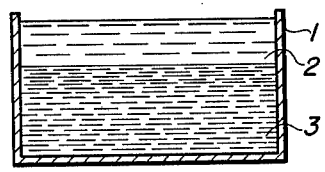
Figure 2:
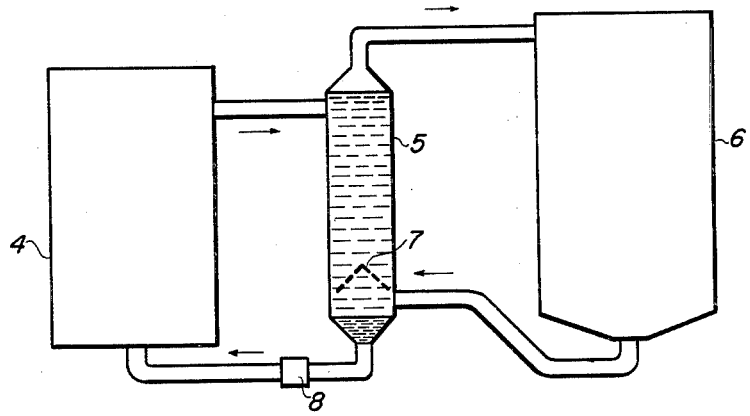
Figure 3:
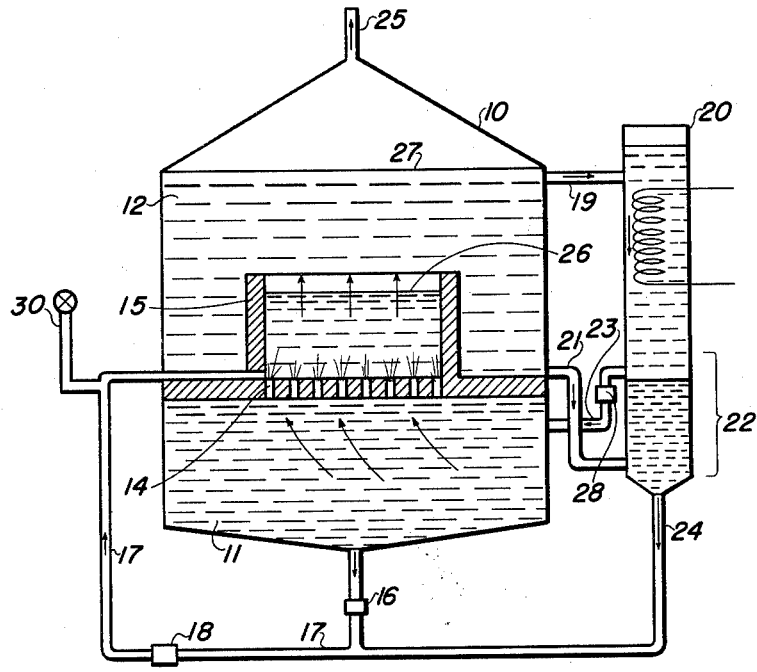
Figure 4:
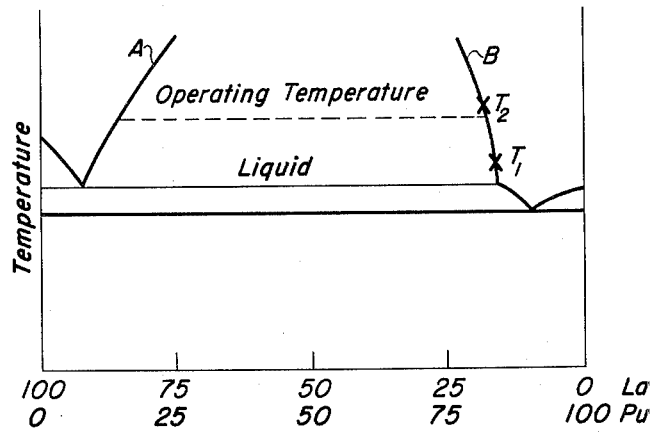

Further objects of the present invention are apparent from the following specification and drawing in which FIGURE 1 illustrates the principle of the scavenging system expressed in the present invention, FIGURE 2 shows a simple scheme for cleaning a liquid metal reactor fuel external to the reactor, and FIGURE 3 shows a system for cleaning a liquid metal reactor fuel within the critical area of the reactor.

The present invention comprises a means and a method for bringing a foreign metal in intimate contact with a liquid metal fuel such that the fission product impurities which have been created in the fuel go into solution with the foreign metal and may be subsequently removed. (It is understood that "fuel" as used herein means a nuclear reactor liquid metal fuel, such as plutonium, an alloy of plutonium, etc.) The foreign metal chosen to scavenge the fuel must have certain properties so that it will not interfere with the normal operation of the reactor. Therefore, the operability of such a system is dependent upon the following characteristics:

(1) The scavenging liquid must be essentially immiscible with the liquid fuel so that it may be removed from the fuel without any chemical processing, i.e., an alloy system of plutonium and the scavenging element must have a useful range of liquid immiscibility at the desired reactor operating temperature.

(2) The scavenging liquid must have an affinity for fission products so that it can perform its function of washing the fission products from the fuel.

(3) The scavenging liquid must have good neutronic characteristics if such cleansing action is to take place within the reactor.

(4) The scavenging liquid must be of lower density than the fuel and if it is to be used for heat removal should have good heat transfer characteristics.

The metals which will best meet the above requirements have been found to be: lanthanum, calcium, strontium, barium, magnesium, lithium, sodium and silver. Since of these elements lanthanum is the one having alloying properties most similar to those of plutonium the use of lanthanum as a scavenging liquid should provide the most efficient fission produce removal and hence is the preferred scavenging element for use in the system of the present invention.

Consider, for example a simple system illustrated by FIGURE 1 in which a vessel 1 contains liquid plutonium 3 and liquid lanthanum 2, in such respective proportions and at such a temperature that the two liquids will be immiscible. The lanthanum, being essentially immiscible with the plutonium and of lower specific gravity, will float on the surface of the plutonium. Since the lanthanum will have a small amount of plutonium dissolved in it depending upon the solubility limit for the particular temperature encountered, as will the plutonium liquid have a small amount of lanthanum dissolved in it, the terms "liquid lanthanum" and "liquid plutonium" actually refer to lanthanum-rich liquids and plutonium-rich liquids respectively.) If extraneous elements, such as fission products, are inserted in the liquid plutonium it will be found after a period of time that a portion of these extraneous elements will appear in the liquid lanthanum. This is a result of the affinity of lanthanum for other elements. If instead of allowing the lanthanum to rest above the plutonium in a quiescent manner, the lanthanum is vigorously stirred through the plutonium immediately after the insertion of the extraneous elements, the lanthanum will pick up the extraneous elements at a very rapid rate. In a simple cleaning system as illustrated by FIGURE 1, the lanthanum may be allowed to come to rest on the surface of the plutonium after it has accomplished its scavenging and it may then be removed for processing to remove the impurities it has scavenged. Fresh lanthanum may then be put on top of the plutonium and the cleaning continued.

In a system illustrated by FIGURE 1, it is apparent that the liquid represented by 3 could be a critical mass of plutonium. Thus the invention has disclosed a method for cleaning this mass without removing it from its critical assembly. Since the monetary value of plutonium is very great as compared to the value of lanthanum, it is obvious that a large inventory of lanthanum is practical whereas a large inventory of plutonium is not.

FIGURE 2 shows a system in which the fuel is cleansed in a region external to the reactor. In FIGURE 2 a reactor 4 is connected to a cleansing column 5 by an upper and lower pipe. The fuel is circulated with a pump 8. The column 5 is also connected to a lanthanum supply and purifier 6 in such a manner that the lanthanum flows through column 5, rises upward and is dispersed by sieve 7, and bubbles through the fuel coming out of the top of column 5. In this system the lanthanum can serve also as a heat exchanger and lower the temperature of the plutonium, thereby removing the heat from reactor 4. Since the plutonium would leave column 5 relatively cool it would return to reactor 4 with a minimum amount of dissolved lanthanum.

Another embodiment which illustrates the unusual capabilities of the scavenging system disclosed in the present invention is illustrated in FIGURE 3 wherein the fuel is cleansed by a continuous action within the critical area of the reactor.

The system of FIGURE 3 comprises a vessel 10 which is divided into an upper portion 12 and a lower portion 11. The portions are separated by a baffle 13. Baffle 13 has a plurality of holes 14 in its central portion and an upwardly extending cylindrical container 15 integral with the baffle 13. Lower portion 11 of vessel 10 is connected through a bleeder valve 16 to a fuel injection line 17 which is connected through a fuel pump 18 to the bottom of the interior of cylindrical container 15. At the top of vessel 10 a pipe 19 connects the vessel to a heat exchanger and settling tank 20. At the bottom of portion 12 of vessel 10 a pipe 21 connects that volume to a settling portion 22 of tank 20. The upper part of lower portion 11 of vessel 10 is connected through a pipe 23 to the lower portion of the heat exchanging portion of tank 20. The bottom of the settling portion 22 of the tank 20 is connected through a pipe 24 to fuel injection line 17. The upper part of vessel 10 has an opening 25 for the removal of gaseous fission products.

The system of FIGURE 3 may be operated as follows. Container 15 initially has the scavenging liquid, for example, lanthanum, passing through it at a fairly rapid rate. Liquid plutonium is introduced through pipe 30 to cylindrical container 15 to a level 26 which represents the degree of criticality required for the operation. The plutonium remains in container 15 because holes 14 are quite tiny and the rapid rising of the lanthanum prevents plutonium from leaving through the holes. As the lanthanum passes through the critical mass of plutonium in container 15 it scavenges the fission products which have been born within the plutonium, and at the same time becomes heated because of the heat of nuclear reaction within container 15. The heated lanthanum then passes through pipe 19 into heat exchanger 20 where the heat is removed. As the temperature of the lanthanum is lowered plutonium will drop out because of the decreasing solubility of plutonium in lanthanum. The plutonium settles to the bottom portion 22 of tank 20 where it can be returned to container 15 via pipes 24 and 17. The cooled lanthanum is returned by pump 28 through pipe 23 to the lower portion 11 of vessel 10. This continuous circulation will continue to remove fission products from the plutonium until the plutonium and lanthanum are at equilibrium, at which time it will be necessary to partially draw off lanthanum and purify it. Should the flow of lanthanum through the system fail the plutonium will be prevented from becoming supercritical by its escape through holes 14 into the lower portion 11 of vessel 10 which is so shaped in the lower portion that the plutonium cannot exist in a critical assembly due to the large diameter it will assume.

Since the melting point of pure plutonium is higher than may be desired for most liquid fuel reactor applications it is probable that the fuel utilized will be a plutonium alloy of lower melting point, such as a eutectic of plutonium and nickel, plutonium and cobalt, or plutonium and iron. For example, the plutonium-nickel eutectic at 13 atomic percent nickel has a melting point of 465° C., compared to the 640° C. melting point of pure plutonium. If an alloy of plutonium is used as the reactor fuel, the scavenging liquid metal must have alloyed with it an equilibrium proportion of the alloying metal, otherwise, due to its scavenging action it would remove the alloying metal from the plutonium. Since, at the desired reactor operating temperature, the scavenging element-fuel alloying element composition must also be in liquid form, it becomes necessary to consider the scavenging element-fuel alloying element eutectic temperature. The lanthanum-iron eutectic temperature is not significantly lower than the melting temperature of pure plutonium, hence a plutonium-iron eutectic alloy, used in conjunction with a lanthanum scavenging liquid, would not provide the desired lowering of permissible reactor operating temperature. However, the lanthanum-nickel eutectic at 20 atomic percent nickel has a melting point of 540° C. and the lanthanum-cobalt eutectic at about 18 atomic percent cobalt has a melting point of 547° C. Therefore, use of a plutonium-nickel eutectic or a plutonium-cobalt eutectic fuel composition, in conjunction with a lanthanum scavenging liquid, will provide practical liquid fuel reactor systems for reactor operating temperatures at least as low as 600° C.

As mentioned above, a Pu—Ni eutectic exists at 13 a/o Ni, 87 a/o Pu and 465° C., and a La—Ni eutectic exists at 20 a/o Ni, 80 a/o La and 540° C. (The symbol "a/o" is an abbreviation designating atomic percent.) It has been found that ternary Pu—La—Ni alloys containing from 10 to 30 a/o Ni and from zero to 43 a/o Pu (the remainder is La) melt to form a single liquid, and that the Ni content which gives the lowest melting temperature in such alloys varies from 20 a/o Ni at zero Pu to 23 a/o Ni at 43 a/o Pu. Note that 23 a/o Ni is not intermediate between the two composition extremes of the aforementioned binary eutectics (13 a/o Ni, 87 a/o Pu, 0 a/o La; and 20 a/o Ni, 0 a/o Pu, 80 a/o La) as would be normally expected. The melting temperatures of lowest-melting compositions (along the eutectic valley) between 20 a/o Ni, 80 a/o La and 23 a/o Ni, 43 a/o Pu, 34 a/o La are not in excess of 540° C. Thus, at a temperature of 600° C. all of the low-melting alloys discussed above (both binary and ternary) are liquid.

If the two binary alloys specified above are placed in the same container at 600° C. or higher, they will form two immiscible liquid layers, i.e., the less dense, more La-rich liquid will float as a layer overlying the heavier, more Pu-rich liquid layer at the bottom of the container. Through the surface at which the two liquid layers are in contact there will, however, occur: (1) some migration of Pu atoms into the more La-rich liquid, thus forming a solution of Pu and Ni in liquid La; and, (2) some migration of La atoms into the more Pu-rich layer, thus forming a solution of both La and Ni in liquid Pu.

In general, it is to be expected that there will be a redistribution of Ni atoms between the two immiscible liquid layers, and thus it is not to be expected that the Ni contents will necessarily remain such as to constitute a low-melting composition in each layer. It has, however, been found by experiment that, if the volumes of the two layers are approximately equal and if the average Ni content of the overall two-layer Pu—La—Ni alloy is about 18 a/o, the compositions of both layers will be very close to being the lowest-melting possible from the standpoint of Ni content in relation to the equilibrium proportions of Pu and La contained in each liquid layer. Thus both layers will continue to be completely liquid at 600° C. and higher.

It has further been established experimentally that, if a ternary alloy containing 18 a/o Ni, 19 a/o La and 63 a/o Pu is equilibrated in the range of 600 to 750° C., the volumes of two immiscible liquid layers will be approximately equal, and the Ni content of each layer will differ from the lowest-melting composition possible for that layer by amount too small to be distinguished by means of micro-structural examination with the metallographic microscope, i.e., the layer having the higher La content will contain almost exactly 23 a/o Ni and the layer having the lower La content will contain almost exactly 13 a/o Ni. It was also found that no variation of Ni content occurred as the equilibration temperature was varied from 600 to 750° C.

Thus, in the case of the alloy specified in the preceding paragraph, the compositions listed in the following table were found for each of the two liquid layers at each of the temperatures indicated. The amount of Pu in the higher La content layers and the amount of La in the lower La content layers were found by chemical analysis, and the Ni contents were established by metallographic examination of the equilibrated alloys. The remaining values listed in the table were computed by difference.

| Temp., °C. | Higher La Content Liquid, a/o | | | Lower La Content Liquid, a/o | | |
|---|---|---|---|---|---|---|
| | Pu | La | Ni | Pu | La | Ni |
| 750 | 43.0 | 34.0 | 23 | 83.4 | 3.60 | 13 |
| 675 | 43.5 | 33.5 | 23 | 83.8 | 3.17 | 13 |
| 600 | 43.5 | 33.5 | 23 | 84.0 | 3.04 | 13 |

Thus, it has been established that if an alloy containing approximately 84 a/o Pu, 3 a/o La and 13 a/o Ni is employed at 600° C. as the fuel in a nuclear reactor, the scavenging liquid alloy that would exist in equilibrium with this liquid alloy fuel at 600° C. would contain almost exactly 43.5 a/o Pu, 33.5 a/o La and 23 a/o Ni. It has further been established that at higher operating temperatures (up to 750° C.) very little change in the compositions of the two liquid phases in equilibrium with each other will occur (as indicated in the above table).

Hence, for the in-pile scavenging principle of this invention to be applied with a Pu—La—Ni liquid alloy fuel at any temperature between 600 and 750° C., the composition of the fuel alloy must necessarily be quite close to 84 a/o Pu, 3 a/o La and 13 a/o Ni, and the composition of the scavenging alloy in equilibrium with it will be not far from 43.5 a/o Pu, 33.5 a/o La and 23 a/o Ni. As long as the latter composition is maintained in the scavenging alloy and some portion of the scavenging alloy is kept in contact with the fuel alloy, the foregoing composition of the fuel alloy will be maintained. Thus, the scavenging alloy can be introduced into and removed from, i.e., circulated through, the reactor with no effect on the fuel alloy other than the removal of fission products from it and the replacement of Pu in the fuel alloy as it is burned up.

The relative amounts (volumes) of the two different liquid alloys may be varied in any convenient or practical manner since their relative amounts have no effect on the equilibrium compositions of the two different alloys. Although, for in-pile scavenging of the fuel alloy, the high Pu content of the scavenging alloy introduces many fissionable atoms into the neutron flux of the reactor that must be taken into account in its nuclear behavior and also increases somewhat the amount of plutonium inventory required for reactor operation, the proportion of Pu inventory required by the scavenging alloy need not be great, because this alloy can be used in limited amount and recirculated frequently with an intervening cleanup step. An advantage of the higher Pu content in the scavenging alloy is that the high Pu may be expected to increase further (relative to pure La) the efficiency of the scavenging alloy as a remover of fission products from a Pu-rich fuel.

As has been mentioned above, La and Co form a eutectic at approximately 18 a/o Co, 82 a/o La and 547° C., and it is well known that there exists a Pu—Co eutectic at 12 a/o Co, 88 a/o Pu and 408° C. Hence, it is to be expected that immiscible liquid layering can also be realized in a nuclear reactor with a less La-rich Pu—La—Co liquid alloy fuel overlain by a more La-rich Pu—La—Co scavenging liquid, in a manner exactly analogous to that described above for the Pu—La—Ni alloys. It is further to be expected, however, that the Pu content of the less Pu-rich Pu—La—Co scavenging liquid, like that of the less Pu-rich Pu—La—Ni liquid, would also be rather high. Thus the Pu—La—Co and Pu—La—Ni possibilities are considered to be roughly comparable with respect to their advantages and disadvantages.

There exist, however, other possibilities for the composition of the scavenging liquid metal (or alloy) that would involve a lower content of Pu in the scavenging liquid although these other liquid metals are probably less efficient than the Pu—La combinations as removers of fission products. Moreover, certain other Pu-containing liquid fuel alloys, such as the Ce-diluted Pu—Ce—Co and Pu—Ce—Ni alloys (see my U.S. Patent 2,901,345, Aug. 25, 1959) should have a much smaller (if not zero) liquid miscibility gap with the Pu—La combinations than do the undiluted Pu eutectic fuels. Hence, scavenging alloys based on Pu immiscibility with something other than La must be used with the Ce-diluted fuels.

A eutectic reported in the literature (F. Wiebke, Z. anorg. Chem., vol. 193 (1930), pp. 297-310) to exist at about 15 a/o Ag, 85 a/o Ba and 340° C. appears to be a possibility for the Pu—Ce—Co and Pu—Ce—Ni fuel alloys. From what is known regarding the binary alloying behaviors represented by all combinations of pairs of the component metals contained in these three alloys, it is to be expected that at reactor temperatures (600 to 750° C.) the solubility of either Ag or Ba in the Pu—Ce—Co and Pu—Ce—Ni alloys would be negligible (less than 0.5 a/o), and that the solubilities of Ce, Co and Ni in the Ba—Ag eutectic liquid would also be negligible. Although the solubility of Pu in this scavenging liquid is probably not negligible, it should be significantly lower than the Pu solubility in the Pu—La scavenging liquids.

If, however, the Ba—Ag eutectic liquid is used with the very dilute Pu—Ce—Cu liquid fuels (see my U.S. Patent 2,886,504, May 12, 1959), both the liquid immiscibility and the low-melting compositions may be expected to be disturbed by an interchange of Cu and Ag atoms between the fuel and scavenger alloys. In this case, a more likely possibility for the scavenger liquid appears to be a Ca—Mg eutectic alloy, reported in the literature (H. Vosskuehler, Z. Metallkunde, vol. 29, 1937, pp. 236-237; W. Klemm and F. Dinkelacker, Z. anorg. Chem., vol. 255, 1947, pp. 2-12) to exist at 27 a/o Mg, 73 a/o Ca and 445° C. Again, from what is known of the binary alloying behaviors among pairs of metals taken from the group Ca, Mg, Pu, Ce and Cu, no more than negligible amounts of Ca and Mg should dissolve in the Pu—Ce—Cu liquid, no more than negligible amounts of Ce and Cu in the Ca—Mg liquid, and the solubility of Pu in the Ca—Mg liquid should be very much less than the Pu solubility in either the Ba—Ag, the La—Ni or the La—Co eutectic liquids.

Finally, pure Li, which melts at 186° C., is a possible scavenging liquid in which none of the above-mentioned fuel components (i.e., Pu, Ce, Fe, Ni, Co and Cu) would be expected to have more than negligible solubilities, and which similarly should have no more than negligible solubility in any of the Pu-containing fuel alloys. However, from known alloying relationships, the efficiency of the various above-mentioned scavenging liquids as fission-products removers is expected to decrease in the following order:

(1) Pu—La—Ni and Pu—La—Co alloys
(2) The Ba—Ag eutectic alloy
(3) The Ca—Mg eutectic alloy
(4) Pure Li.

Many other possibilities for scavenging liquids are known to exist among the pure metals and alloys of the metals mentioned above as forming immiscible liquids with Pu, namely: Li, Na, K, Mg, Ca, Sr, Ba, La and Ag.

Although the methods for scavenging which have been described in the foregoing are all considered satisfactory for removing fission products from a liquid reactor fuel, other methods can be developed by those skilled in the art based upon the knowledge gained by disclosure of the present invention. This scavenging may, for example, be used in reconditioning the liquid fuel of co-pending reactor application S.N. 700,918, filed December 5, 1957, entitled "Fast Breeder Reactor," by L. D. P. King et al., the disclosure of which is incorporated herein by reference. In this co-pending reactor the scavenging would, in the preferred embodiment, be done external to the critical mass.

Therefore it is understood that the present invention is not limited by the foregoing specification but only by the appended claims.

What is claimed is:

1. A method for removing fission products from a nuclear reactor liquid fuel during normal reactor operation at a temperature within the range of from 600° C. to 750° C. and without interference with normal reactor operation or any significant change in fuel composition, the liquid fuel consisting of 84 atomic percent plutonium, 3 atomic percent lanthanum and 13 atomic percent nickel, comprising mixing a liquid scavenging alloy consisting of 43.5 atomic percent plutonium, 33.5 atomic percent lanthanum and 23 atomic percent nickel with said liquid fuel, removing a portion of the said liquid fuel and scavenging alloy to a quiescent zone wherein the immiscible higher lanthanum content and lower lanthanum content liquid layers are formed and said fission products are dissolved in said higher lanthanum content liquid.

2. A method for removing fission products from a nuclear reactor liquid fuel during normal reactor operation at a temperature within the range of from 600° C. to 750° C. and without interference with normal reactor operation or any significant change in fuel composition, the liquid fuel consisting of 84 atomic percent plutonium, 3 atomic percent lanthanum and 13 atomic percent nickel, comprising the steps of mixing a liquid scavenging alloy consisting of 43.5 atomic percent plutonium, 33.5 atomic percent lanthanum and 23 atomic percent nickel with said liquid fuel, removing a portion of the said liquid fuel and scavenging alloy to a quiescent zone wherein the immiscible higher lanthanum content and lower lanthanum content liquid layers are formed and said fission products are dissolved in said higher lanthanum content liquid separating the said higher lanthanum content liquid from the lower lanthanum content liquid due to their difference in specific gravity, and removing said fission products from said higher lanthanum content liquid and returning to the reactor core vessel the lower lanthanum content liquid containing in it the clean plutonium fuel.

3. A method for removing fission products from a nuclear reactor liquid fuel during normal reactor operation at a temperature within the range of from 600° C. to 750° C. and without interference with normal reactor operation or any significant change in fuel composition, the liquid fuel consisting of 84 atomic percent plutonium, 3 atomic percent lanthanum and 13 atomic percent nickel, comprising the steps of mixing a liquid scavenging alloy consisting of 43.5 atomic percent plutonium, 33.5 atomic percent lanthanum and 23 atomic percent nickel with said liquid fuel, removing a portion of the said liquid fuel and scavenging alloy to a quiescent zone wherein the immiscible higher lanthanum content and lower lanthanum content liquid layers are formed and said fission products are dissolved in said higher lanthanum content liquid, and removing said higher lanthanum content liquid from said reactor while replacing it with fresh higher lanthanum content liquid which is the said scavenging alloy, and returning to the reactor core vessel the lower lanthanum content liquid containing the clean plutonium fuel.

References Cited in the file of this patent

UNITED STATES PATENTS

| | | |
|---|---|---|
| 2,758,023 | Bareis | Aug. 7, 1956 |
| 2,778,730 | Spedding et al. | Jan. 22, 1957 |

OTHER REFERENCES

Voight: Paper No. P/545, The Purification of Uranium Reactor Fuel by Liquid-Metal Extraction, International Conference on the Peaceful Uses of Atomic Energy, vol. 9, pages 591–595, 1955.